A. RUBIN.
HOSE COUPLING.
APPLICATION FILED JUNE 30, 1919.

1,343,853.

Patented June 15, 1920.

INVENTOR.
BY Abraham Rubin

Victor J. Evans
ATTORNEY.

UNITED STATES PATENT OFFICE.

ABRAHAM RUBIN, OF NEW YORK, N. Y.

HOSE-COUPLING.

1,343,853.

Specification of Letters Patent.  Patented June 15, 1920.

Application filed June 30, 1919. Serial No. 307,536.

*To all whom it may concern:*

Be it known that I, ABRAHAM RUBIN, a citizen of the United States, residing at New York, in the county of New York and State of New York, have invented new and useful Improvements in Hose-Couplings, of which the following is a specification.

This invention relates to new and useful improvements in hose couplings and has for its principal object to provide a coupling particularly adapted for use in connection with a hose having a flexible metal lining formed of a continuous strip with one edge laid upon the other spirally thereby providing through the entire length of the hose, a spiral groove in connection with which this improved coupling operates.

Another object of the invention resides in the provision of a coupling which is screwed into place and which after being positioned is secured in such a manner as to render its removal either by intent or accident, practically impossible owing to the binding action of the spiral thread of the hose against the thread of the coupling.

With the above and other objects in view as will become apparent as the description proceeds, the invention consists in the novel construction, combination and arrangement of parts which will be fully set forth in the following specification, claims and illustrated in the accompanying drawings, in which:—

Figure 1:
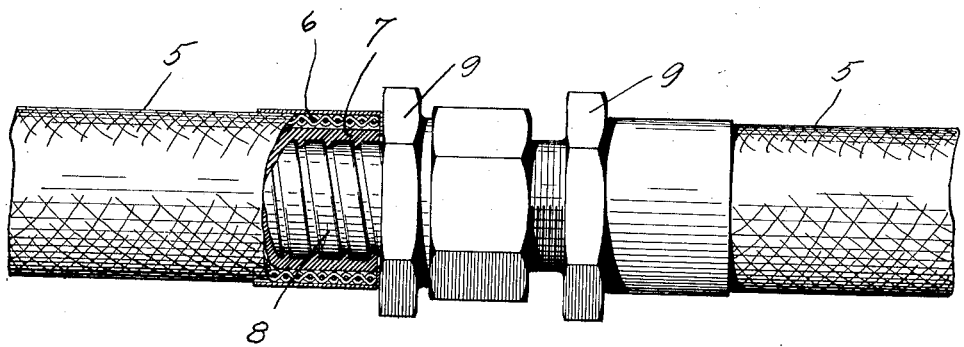
Figure 2:
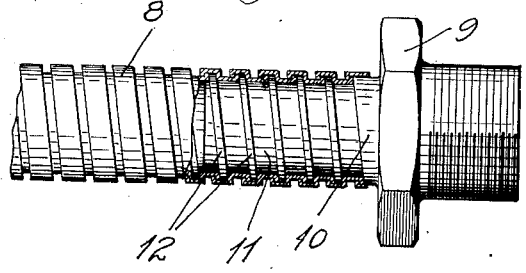

Figure 1 is a fragmentary view of a hose with this coupling applied thereto, illustrating portions of said hose in section to more clearly show the details of construction and Fig. 2 is a view of the coupling showing the same applied to a portion of the metallic lining of the hose.

Referring to the drawing by characters of reference, the numeral 5 designates the hose in its entirety which comprises the outer fabric casing 6 and a rubber inner casing 7. As illustrated in the drawing the rubber casing surrounds the inner metallic foundation 8 which consists of a continuous strip formed at its edges with inturned and outturned flanges which are arranged to bind against each other in the manner shown in Fig. 2. This strip is preferably formed in a relatively S shaped transverse section and is wound spirally upon itself to form a continuous flexible tube with the outturned and in turned flanges above referred to in close contact. It is to be understood that suitable packing material, (not shown) may be provided between the flanges as is the usual case with this form of flexible tubing. From the foregoing it will be apparent that a hose foundation of the above described construction provides a plurality of internal spiral grooves which are admirably adapted to form screw threads.

The hose coupling consists of a main body portion 9 which may carry either an externally threaded extension or an internally threaded sleeve at one end while the opposite end of said body portion is formed with a tubular extension 10 pivoted at its exterior with a spiral groove 11 forming outstanding spiral flanges 12 which are adapted to enter the spiral grooves of the hose foundation 8 as clearly illustrated in Fig. 2.

In assembling the device the nipple or tubular extension 10 is threaded into the hose foundation 8 and it will be obvious that such movement will tend to expand the foundation and thereby permit of the ready entrance of the nipple into the foundation. Upon reversing the direction of rotation, however, it will be evident that the frictional engagement of the nipple with the walls of the foundation will be such as to cause the foundation to contract and bind on the nipple, thereby rendering the removal of the nipple practically impossible and thus avoiding the possibility of the same being accidentally disconnected from the coupling.

While in the foregoing there has been shown and described the preferred embodiment of this invention it is to be understood that certain minor changes in the details of construction, combination and arrangement of parts may be resorted to without departing from the spirit and scope of the invention.

What is claimed as new is:—

In a device of the class described, the combination of a hose having a foundation of springy spiral formation in which the windings thereof are capable of contraction and expansion to vary the internal diameter thereof, a coupling member having a portion of substantially uniform diameter throughout insertible in the end of the hose and adapted to be rotated therein, said member co-acting with the windings to permit of free rotation in one direction of the member and effect an expansion of the windings of the hose and to cause contraction of the windings against the member on tendency of the member to revolve in an opposite direction, said member also comprising a flange portion adjacent to the first said portion, and a ferrule adapted to fit on the end of said hose and provided with an annular shoulder adapted to be firmly seated between the end of said hose and the flange portion of said member.

In testimony whereof I have affixed my signature.

ABRAHAM RUBIN.